United States Patent Office 3,264,703
Patented August 9, 1966

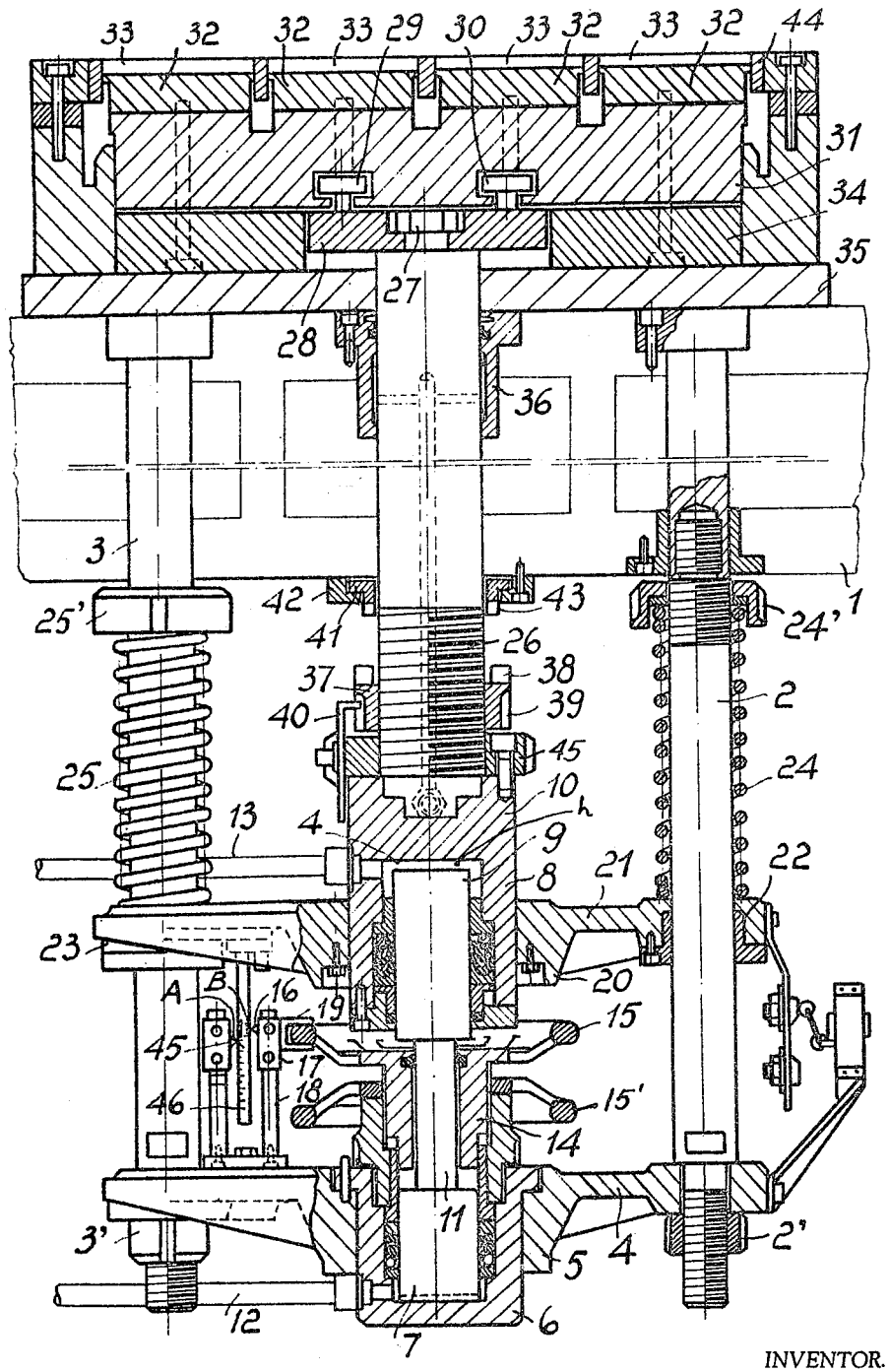

3,264,703
HYDRAULICALLY MOVED CONTROL DEVICES OF THE LOWER PRESSING PLUNGERS IN MOULDS FOR TILES AND THE LIKE OBJECTS IN CERAMIC
Alberto Gatti, 8 Via Friuli, Milan, Italy
Filed Dec. 10, 1963, Ser. No. 329,522
Claims priority, application Italy, Dec. 11, 1962, 24,256/62
19 Claims. (Cl. 25—84)

The present invention relates to a molding press for the manufacturing of tiles or similar articles.

Molding presses of this type are known in the art in which a press platen located in the cavity of a stationary mold is moved by moving means relative to the stationary mold so that the material in the mold may be compressed and the compressed material ejected therefrom.

The known molding presses have however the disadvantage that the moving means for moving the press platen are relatively complicated and require considerable space. Since the mold for large presses of this type is usually mounted directly on the floor or on a support plate abutting against the floor while the moving means are located in a pit located beneath the support plate, the known molding presses of this type require relatively large pits which increases the cost of the arrangement and which also makes mounting of the molding press a difficult task.

It is an object of the present invention to overcome these disadvantages of molding presses of the aforementioned kind.

It is an additional object of the present invention to provide a molding press having compact moving means for moving the press platen relative to the fixed mold so that the moving means may be accommodated in a pit of relative small size.

It is a further object of the present invention to provide for a molding press of the aforementioned kind in which the moving means are of compact construction and include relatively few and simple parts so that the moving means may be constructed at reasonable cost and will stand up trouble-free under extended use.

It is also an object of the present invention to provide for a molding press of the aforementioned kind in which the compression stroke and the ejection stroke of the press can be easily adjusted.

It is yet an object of the present invention to provide for a molding press of the aforementioned kind in which the movable parts are perfectly guided during the movement thereof.

With these objects in view, the molding press according to the present invention mainly comprises support means, a mold fixed to the support means and formed with a cavity, press platen means in the mold for compressing material therein and for ejecting the compressed material therefrom, moving means for moving the press platen means from a rest position in one direction along an active stroke having a pressure portion for compressing material in the mold cavity and an ejection portion for ejecting the compressed material from the cavity. The aforementioned moving means comprise first stationary cylinder means having a closed end facing away from the press platen means, a second movable cylinder means having a closed end facing said press platen means, elongated piston means having opposite ends respectively located in said first and second cylinder means, and a pair of conduit means respectively communicating with said first and said second cylinder means for feeding pressure fluid into and out of the space between the closed ends of said cylinder means and said opposite ends of said elongated piston means. The press further comprises connecting means connecting the press platen to said movable cylinder means for movement therewith, first stop means cooperating with said elongated piston means for limiting movement of the latter during said active stroke relative to said stationary cylinder means, and second stop means cooperating with said movable cylinder means for limiting total movement of the latter during said active stroke.

The stationary and the movable cylinder means are preferably coaxially aligned with each other, and the elongated piston means may comprise a first piston slidably guided in the stationary cylinder means, a second piston slidably guided in the movable cylinder means, and a coaxial piston rod extending between said first and second piston and being fixed thereto.

The connecting means which connect the movable cylinder means with the press platen are preferably in the form of a rigid elongated member coaxially arranged with said cylinder means and connected at opposite ends thereof to said closed end of said movable cylinder means to said press platen, respectively.

The support means preferably include a base plate formed with an opening therethrough through which the rigid elongated member extends, slidably guided therein. The support means may include in addition a pair of rods respectively arranged at opposite sides and extending substantially parallel to the aforementioned rigid elongated member, fixed at the upper end thereof to the base plate and carrying in the region of the lower ends thereof a first traverse on which the stationary cylinder is mounted. A second traverse is preferably provided located between the base plate and the first traverse and slidably guided at opposite ends thereof on the pair of rods, respectively, and the movable cylinder is mounted on the second traverse. The press may also include spring means engaging the second traverse and which are biassed so as to tend to move said second traverse toward the first traverse.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing, in which the drawing is a longitudinal sectional view through the press according to the present invention.

Referring now to the drawing, it will be seen that the molding press according to the present invention comprises support means which include a base plate 1 on the upper surface thereof, a spacer plate 35 is located which supports a mold 44 formed with a plurality of cavities 33 adapted to be filled with the material to be compressed by the press. A plurality of lower plungers 32 are respectively located in the cavities 33 and the plungers are supported on a common press platen 31. An additional spacer plate 34 may be sandwiched between the press platen 31 and the spacer plate 35. This additional spacer plate 34 is formed with a central opening. The usual counterplate with the upper plungers thereon which cooperate with the lower plungers 32 are not shown in the drawing.

The press includes further moving means for moving the press platen 31 and the lower plungers 32 mounted thereon from the rest position shown in the drawings in upward direction for first compressing material in the mold cavities 33 and for subsequently ejecting the compressed material from the cavity. The moving means comprise first stationary cylinder means 6 having a closed bottom end facing away from the press platen 31, a second movable cylinder 8 having a closed top end or cylinder head 10 facing the press platen 31, and elongated piston means 7, 9 and 11 having opposite ends respectively located in the stationary cylinder means 6 and the movable cylinder means 8. The elongated piston means preferably comprise, as shown in the drawing, a first piston 7 slidably guided in the stationary cylinder means 6, a second piston 9 slidably guided in the movable cylinder means 8, and a piston rod 11 having a smaller diameter than the aforementioned two pistons, coaxially arranged with the latter and fixed at opposite ends to said pistons. A pair of conduits 12 and 13 respectively communicate with the interior of the cylinder means 6 adjacent the closed bottom thereof and with the interior of the cylinder means 8 are adjacent the top end thereof for feeding pressure fluid, preferably oil under pressure, into the spaces between the closed ends of the first and second cylinder means and the opposite ends of the elongated piston means therein, and for discharging pressure fluid from the spaces so that the movable cylinder means 8 and the piston means 7, 9, 11 may return to the rest position. Control valves which may be electromagnetically operated in a known manner, which are not shown in a drawing, cooperate with the conduits 12 and 13 for connecting these conduits either to a source of oil under pressure during feeding of oil under pressure into the aforementioned spaces, or to a reservoir for discharging oil from the aforementioned spaces into the reservoir.

In the rest position, as shown in the drawing, the bottom face of the first piston 7 abuts against the closed bottom end of the stationary cylinder means 6 and a groove, as indicated by the dotted line, is provided on the bottom surface of the first piston 7 so that even if the piston 7 abuts against the bottom wall of the cylinder means 6, pressure oil may penetrate beneath the first piston 7. The top face of the scond piston 9 is preferably spaced a distance $h$ from the bottom surface of the cylinder head 10 so as to form even in the rest position of the press a chamber 4 with which the conduit 13 communicates.

The press includes further connecting means for connecting the movable cylinder means 8 to the press platen 31. The connecting means may include, as shown in the drawing, an elongated rigid preferably cylindrical member 26 having a threaded lower end portion which is threadingly connected to an annular member 45 fixed by screws or the like to the upper end of the cylinder head 10. The elongated member 26 extends through an opening in the base plate 1 and a bushing 36 provided in this opening serves to guide the elongated member 26 for movement in vertical direction. A clamping head 27 is connected to the upper end of the elongated member 26 and this clamping head serves to clamp an intermediate plate 28 located in an opening of the spacer plate 34 to the upper end of the elongated member 26. The intermediate plate 28 carries fixedly connected thereto a pair of T-shaped heads 29 and 30 which project transversely spaced from each other upwardly from the intermediate plate 28 and which are respectively engaged in corresponding shaped grooves of the press platen 31.

The molding press includes further first stop means cooperating with the elongated piston means for limiting upward movement of the latter relative to the stationary cylinder means 6. The first stop means include an annular member or bushing 14 surrounding the piston rod 11 and being threadingly connected to the stationary cylinder means 6. The bottom face of the bushing 14 is adapted to engage the shoulder face formed about the piston rod 11 on the upper surface of the first piston 7 when the latter moves in upward direction. Depending on the axial adjustment of the bushing 14 relative to the stationary cylinder means 6, the upward stroke of the elongated piston means 7, 9 and 11 relative to the stationary cylinder means 6 is thereby limited. A hand wheel 15 is fixedly connected to the upper end of the bushing 14 and serves to turn the latter about its axis to thereby adjust the axial position of the bushing 14 relative to the stationary cylinder means. Locking means are provided for locking the bushing 14 in any adjusted position, and the locking means may include, as shown in the drawing, an additional bushing surrounding the bushing 14 and carrying on the upper end thereof a hand wheel 15'.

The press includes further second stop means cooperating with the movable cylinder means 8 for limiting the total upward movement of the latter. The second stop means may include, as shown in the drawing, an annular member 37 provided with an inner thread threadingly engaging with the threads on the threaded portion on the bottom end of the elongated member 26, and a second annular member 41 coaxially arranged about the member 26 and held in an annular member 42 fixed by screws or the like to the bottom surface of the base plate 1 so as to be turnable about its axis. The cooperating annular members 37 and 41 are respectively provided with castellated rims 38 and 43 projecting toward each other and having each a plurality of teeth alternating with cutouts. The position of the member 41 may therefore be adjusted by turning it through a small angle about its axis so that in one of the adjusted positions the teeth on the member 41 will be arranged opposite to the teeth on the member 37 so that during upward movement of the movable cylinder means 8 the oppositely arranged teeth will engage each other at the end faces thereof, while in the other adjusted position the teeth on one of the aforementioned members will be arranged opposite the cutouts in the castellated rim of the other member so that the movable cylinder means 8 may move further upwardly than in the first mentioned adjusted position of the two cooperating members with respect to each other. The position of the annular member 37 on the member 26 is adjusted in such a manner that in the first mentioned of the adjusted positions of the member 41 the press platen 31 and the plungers 32 carried thereby may be raised by the movable cylinder means 8 during the ejection stroke of the latter until the upper surfaces of the plungers 32 are flush with the upper surface of the mold 44 when the cooperating members 37 and 41 engage each other with the end faces of the teeth, whereas when the annular member 41 is turned to the second mentioned adjusted position, the press platen 31 and the plungers 32 thereof can be raised higher than before so that the plungers may be cleaned when necessary. The described arrangemnt of the second stop means permits therefore to raise the press platen 31 if cleaning of the plungers 32 carried thereby is required, without adjusting the position of the annular member 37 on the elongated member 26. The annular member 37 is formed on the outer periphery thereof with a plurality of angularly spaced slots 39 in which a locking pawl 40 carried by the member 45 may be selectively engaged to thereby lock the annular member 37 in any adjusted position.

The support means preferably include also a pair of rods 3 respectively extending substantially parallel to the elongated member 26 at opposite sides of the latter through openings in the base plate 1 and connected thereto as clearly shown in the drawing. Each of the rods 3 is formed at the bottom end thereof with a threaded blind bore into which the threaded top ends of elongated rods 2 are respectively threaded. Each of the rods 2 has a threaded bottom end portion of smaller diameter and a traverse 4 is clamped by means of nuts 2' and 3' onto the shoulder faces of the rods 2 formed about the lower ends of reduced diameter thereof. The traverse 4 is formed with a central seat 5 in which the stationary cylinder means 6 is seated and fastened thereto as shown in the drawing.

A second traverse 21 is located between the traverse 4 and the bottom surface of the base plate 1. The second traverse 21 has a central seat 20 in which the movable cylinder 8 is located and held, and the second traverse is provided at opposite ends thereof with bushings 22 and 23 which are respectively slidably guided on the rods 2. The rods 2 serve therefore to hold the stationary cylinder means 6 a fixed distance from the mold 44 and to guide the movable cylinder means 8 during its axial movement. Spring means in the form of a pair of coil springs 24 and 25, arranged about the rods 2, engage with the lower ends thereof the second traverse 21 and with the upper ends thereof a pair of nuts 24' and 25', respectively, which are threadingly connected to threaded upper portions of the rods 2. The springs are biassed so as to tend to move the second traverse 21 and the movable cylinder 8 connected thereto in downward direction. The springs 24 and 25 may be stressed to a greater or lesser degree by adjusting the position of the nuts 24' and 25' on the respective rods 2.

The press includes further indexing means for indicating the axial position of the annular member 14 forming the first stop means. The indexing means may include, as shown in the drawing, a scale B provided on a vertical rod 46 fixed at its upper end to the second traverse 21, a slide member having a pointer 16 cooperating with the scale B, and being guided on a guide rod 18 fixed to the first traverse for projecting upwardly therefrom and a fork-shaped member 19 fixed to the slide member 17 and engaging the hand wheel 15 so as to follow axial movement of the latter while not impeding turning movement of the hand wheel 15 about its axis. The indexing means may also include a second scale A likewise provided on the rod 46 fixed to the traverse 21 and a pointer 45 stationarily connected to the traverse 4 in the manner as shown in the drawing cooperates with the scale A so that the total upward movement the movable cylinder means 8 will perform can be read on this scale.

The press above described operates as follows:

Before beginning of the operation the hand wheel 15 is turned to adjust the bushing 14 of the first stop means in axial direction to the desired position which can be read on the scale B. The position of the annular member 37 is also properly adjusted and the members 14 and 37 are then locked in their adjusted positions. The cavities 33 are then filled with a material to be compressed and a counterplate not shown in the drawing is put in place. Pressure fluid is then fed through the conduit 12 in the stationary cylinder means 6 so as to raise the first piston therein until the upper shoulder face thereof engages the bottom face of the annular member 14 forming the first stop means. During lifting of the first piston 7 the second piston 9 is likewise lifted to engage thereby the cylinder head 10 of the movable cylinder 8 and to lift the latter through a distance equal the stroke of the first piston 7 minus the clearance $h$. The press platen 31 connected by the member 26 to the movable cylinder 8 and the plungers 32 carried by the press platen will move upwardly the same amount as the cylinder 8 is lifted thereby compressing the material in the cavities 33. Pressure fluid is also fed through the conduit 13 into the chamber 4 to lift the movable cylinder 8 through a further distance until the teeth 38 on the annular members 37 will engage the teeth 43 on the annular member 42 and during the further stroke the compressed material in the cavities 33 will be ejected. Subsequently thereto pressure fluid will be discharged from the stationary cylinder 6 while the fluid in the chamber 4 is still maintained and the movable cylinder will move downwardly under the action of the springs 24 and 25 until the bottom face of the first piston 7 engages the bottom of the stationary cylinder means 6 and subsequently thereto pressure fluid is also discharged from the chamber 4 through the conduit 13 so that the press will return to the rest position shown in the drawing in which the bottom face of the press platen 31 rests on the top face of the spacer plate 34 while the bottom face of the cylinder head 10 is spaced from the top face of the second piston 9 so that damage of the mechanism during fast downward movement of the movable cylinder 8 and the parts connected thereto is prevented.

The press may also be operated by carrying out first an idle upward stroke, whereafter the cylinder 6 is exhausted while pressure oil is maintained in the movable cylinder 8 by closing the valve controlling flow of oil through the conduit 13 so that oil cannot flow into or out from the cylinder 8. In this position, in which the press platen and the plungers 32 thereon are lowered from their uppermost position, in which the upper faces of the plungers 32 are flush with the top face of the mold 44, for a distance equal to the distance between the bottom surface of the bushing 14 and the top face of the first piston 7, the mold is filled. Thereafter the valve controlling conduit 13 is moved to permit flow of oil from the chamber 4 into the oil reservoir and the movable cylinder 8 moves back under the action of the springs 24 and 25 to the rest position shown in the drawing, whereafter the cycle is repeated. In this way of operation the scale B may be used to establish the filling position for the mold, that is, the quantity of material to be filled into the cavities 33.

The control of pressure fluid through the conduits 12 and 13 is accomplished by valves not shown in the drawing and these valves may be fully automatically operated so that the press will carry out successive cycles in a predetermined manner.

It will be understood that each of the elements described above, or two or more together, may also find a useful application in other types of presses differing from the types described above.

While the invention has been illustrated and described as embodied in a mold press for tiles and similar articles, it is not intended to be limited to the details shown, since various modifications and structural changes may be made without departing in any way from the spirit of the present invention.

For instance in a very large press two elongated members similar to the member 26 may be provided extending parallel and spaced from each other through appropriate openings in the base plate and being fixedly connected at the upper and lower ends thereof to the base plate and the second traverse 21, respectively. In this case the central elongated rigid member 26 shown in the drawing does not have to extend through an opening in the base plate and is not connected at the upper ends thereof to the press platen 31 but extends upwardly from the cylinder head 10 only so far as to permit appropriate axial adjustment of the annular member 37 of the second stop means.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A molding press for tiles and similar articles comprising, in combination, support means; a mold fixed to said support means and formed with at least one cavity; press platen means in said mold cavity for compressing material therein and for ejecting the compressed material therefrom; moving means for moving said press platen means from a rest position in one direction along an active stroke having a compression portion for compressing material in said mold cavity, and an ejection portion for ejecting the compressed material from said cavity, said moving means comprising a first stationary cylinder means having a closed end facing away from said press platen means, a second movable cylinder means having a closed end facing said press platen means, elongated piston means having opposite ends respectively located in said first and second cylinder means, and a pair of conduit means respectively communicating with said first and second cylinder means for feeding pressure fluid into and out of the space between the closed ends of the first and second cylinder means and said opposite ends of said elongated piston means; connecting means connecting said press platen to said movable cylinder means for movement therewith; first stop means cooperating with said elongated piston means for limiting movement of the latter during said active stroke relative to said stationary cylinder means; and second stop means cooperating with said movable cylinder means for limiting total movement of the latter during said active stroke.

2. A press as set forth in claim 1, wherein said stationary and said movable cylinder means are coaxially arranged with each other.

3. A press as set forth in claim 2, wherein said elongated piston means comprises a first piston slidably guided in said stationary cylinder means, a second piston slidably guided in said movable cylinder means, and a coaxial piston rod extending between said first and said second piston fixed thereto.

4. A press as set forth in claim 3, wherein said piston rod has a diameter smaller than that of said first and second pistons so as to form a pair of spaced shoulders facing each other on said first and said second piston, said first stop means being located in the space between said shoulders and engaging the shoulder on said first piston during the active stroke thereof.

5. A press as set forth in claim 4, wherein said first stop means is in the form of an annular member surrounding said piston rod and connected to said stationary cylinder means adjustable in axial direction.

6. A press as set forth in claim 5, and including locking means engaging said annular member for locking the same in any adjusted position.

7. A press as set forth in claim 6, wherein said annular member is threadingly connected to said stationary cylinder means and has a bottom face adapted to engage said shoulder on said first piston, and including a handwheel fixed to the upper end of said annular member for turning the same about its axis so as to adjust the axial position thereof.

8. A press as set forth in claim 7, and including indexing means for indicating the axial position of said annular member, said indexing means comprising a scale extending in direction of said axis, a slide member having a pointer, guide means guiding said slide member movable substantially parallel to said scale, and a fork-shaped member fixed to said slide member and engaging said hand wheel so as to follow axial movement of the latter.

9. A press as set forth in claim 2, wherein said connecting means include a rigid elongated member coaxially arranged with said cylinder means and being connected at opposite ends thereof to said closed end of said movable cylinder means and to said press platen, respectively.

10. A press as set forth in claim 9, wherein said support means include a base plate formed with an opening therethrough, said rigid elongated member extending through said opening and being slidably guided therein.

11. A press as set forth in claim 10, wherein said second stop means include a pair of cooperating members adapted to engage each other at the end of said active stroke, one of said cooperating members being mounted on said base plate and the other on said rigid elongated member.

12. A press as set forth in claim 11, wherein each of said cooperating members is an annular member surrounding said rigid elongated member, and wherein said other of said cooperating members is connected to said rigid elongated member adjustable in axial direction of the latter.

13. A press as set forth in claim 12 and including locking means carried by said movable cylinder means for locking said other of said cooperating members in any adjusted position.

14. A press as set forth in claim 13, wherein said pair of cooperating members forming said second stop means have castellated rims extending toward each other, and said one member of said cooperating members being turnably mounted on said base plate so as to be adjustable between two positions, in one of which the teeth forming the castellated rim thereof are opposite the teeth forming the castellated rim of the other of said cooperating members, and in the other of which the teeth on said one member are opposite cutouts between the teeth of the castellated rim of the other member.

15. A press as set forth in claim 10, wherein said support means include further a pair of rods respectively arranged at opposite sides of and extending substantially parallel to said rigid elongated member, said rods being fixed at the upper ends thereof to said base plate and fixedly carry in the region of the lower ends thereof a first traverse on which that stationary cylinder means is mounted, and includig a second traverse located between said base plate and said first traverse and being slidably guided at opposite ends thereof on said pair of rods, respectively, said movable cylinder means being mounted on said second traverse.

16. A press as set forth in claim 15, and including spring means engaging said second traverse, said spring means being biased so as to tend to move said second traverse toward said first traverse.

17. A press as set forth in claim 16, wherein said spring means are in the form of a pair of coil compression springs respectively arranged about a pair of rods, and including means connected to said rods adjustable in axial direction thereof and engaging said compression springs for stressing the latter to a variable degree.

18. A press as set forth in claim 10, wherein said rigid elongated member is removably connected at the upper ends thereof to said press platen.

19. A press as set forth in claim 18, and including an intermediate plate abutting against the bottom face of said press platen removably connected thereto, said intermediate plate being removably connected to said upper end of said rigid elongated member.

References Cited by the Examiner

UNITED STATES PATENTS

| | | | |
|---|---|---|---|
| 355,409 | 1/1887 | Noble | 25—84 |
| 1,357,258 | 11/1920 | Stevenson | 25—84 |
| 2,280,849 | 4/1942 | Pocock | 18—16 |
| 2,302,132 | 11/1942 | McMillin et al. | 18—16 |
| 2,744,304 | 5/1956 | Kaul | 18—30 |
| 2,757,430 | 8/1956 | Sipe | 25—84 |
| 3,050,809 | 8/1962 | Kupka | 25—91 |
| 3,162,898 | 12/1964 | Fike | 18—2 |

FOREIGN PATENTS 672,922   10/1963   Canada.

J. SPENCER OVERHOLSER, *Primary Examiner.*

G. A. KAP, R. D. BALDWIN, *Assistant Examiners.*